(12) United States Patent
Mason et al.

(10) Patent No.: US 10,641,126 B2
(45) Date of Patent: May 5, 2020

(54) TURBINE ARRANGEMENT

(71) Applicant: ROLLS-ROYCE plc, London (GB)

(72) Inventors: John R Mason, Bristol (GB); David E Brown, Derby (GB)

(73) Assignee: ROLLS-ROYCE plc, London (GB)

(*) Notice: Subject to any disclaimer, the term of this patent is extended or adjusted under 35 U.S.C. 154(b) by 280 days.

(21) Appl. No.: 15/622,659

(22) Filed: Jun. 14, 2017

(65) Prior Publication Data

US 2018/0010479 A1    Jan. 11, 2018

(30) Foreign Application Priority Data

Jul. 5, 2016    (GB) .................................. 1611674.1

(51) Int. Cl.
| | |
|---|---|
| *F01D 5/06* | (2006.01) |
| *F01D 21/00* | (2006.01) |
| *F01D 21/02* | (2006.01) |
| *F02C 9/28* | (2006.01) |
| *G01P 3/481* | (2006.01) |

(52) U.S. Cl.
CPC .............. *F01D 21/003* (2013.01); *F01D 5/06* (2013.01); *F01D 21/02* (2013.01); *F02C 9/28* (2013.01); *G01P 3/481* (2013.01); *F05D 2220/32* (2013.01); *F05D 2220/329* (2013.01)

(58) Field of Classification Search
CPC .......... F01D 21/003; F01D 5/06; F01D 21/02; F02C 9/28; G01P 3/481; F05D 2220/32; F05D 2220/329; F05D 2270/80; F05D 2270/821; F04D 15/0077

USPC .......................................................... 416/61
See application file for complete search history.

(56) References Cited

U.S. PATENT DOCUMENTS

| | | | | |
|---|---|---|---|---|
| 3,610,772 A | * | 10/1971 | Wagle ....................... | F01D 5/06 416/8 |
| 3,625,634 A | * | 12/1971 | Stedfeld .................... | F01D 5/06 416/198 R |
| 3,647,313 A | * | 3/1972 | Koff ......................... | F01D 5/084 415/115 |
| 3,706,509 A | * | 12/1972 | Britt .......................... | F01D 5/06 415/131 |
| 4,277,225 A | * | 7/1981 | Dubois ...................... | F01D 5/06 416/193 A |
| 4,473,988 A | | 10/1984 | Scott | |

(Continued)

FOREIGN PATENT DOCUMENTS

GB        2 226 366 A     6/1990

OTHER PUBLICATIONS

Dec. 8, 2016 Search Report issued in British Patent Application No. 1611674.1.

(Continued)

*Primary Examiner* — Woody A Lee, Jr.
*Assistant Examiner* — Brian Christopher Delrue
(74) *Attorney, Agent, or Firm* — Oliff PLC

(57) ABSTRACT

A turbine arrangement for a gas turbine engine comprising a turbine shaft. An axial array of turbine rotors, having a first axial end and a second axial end. A drive arm coupled between the turbine shaft and the first axial end. A measurement system arranged to measure a parameter of the turbine arrangement, the measurement system positioned at the second axial end. The parameter may be rotational speed.

13 Claims, 2 Drawing Sheets

(56) References Cited

U.S. PATENT DOCUMENTS

| | | | | |
|---|---|---|---|---|
| 4,473,998 A * | 10/1984 | King | ............ | F01D 21/04 |
| | | | | 415/118 |
| 5,288,210 A * | 2/1994 | Albrecht | ............ | F01D 5/066 |
| | | | | 416/198 A |
| 6,494,046 B1 * | 12/2002 | Hayess | ............ | F01D 21/00 |
| | | | | 60/39.091 |
| 6,655,920 B2 * | 12/2003 | Beutin | ............ | F01D 5/063 |
| | | | | 415/199.5 |
| 6,708,482 B2 * | 3/2004 | Seda | ............ | F01D 25/162 |
| | | | | 60/226.1 |
| 7,870,742 B2 * | 1/2011 | Lee | ............ | F01D 5/082 |
| | | | | 60/782 |
| 7,926,289 B2 * | 4/2011 | Lee | ............ | F01D 5/081 |
| | | | | 415/145 |
| 8,382,432 B2 * | 2/2013 | Grissino | ............ | F16J 15/44 |
| | | | | 415/115 |
| 9,410,444 B2 * | 8/2016 | Bacic | ............ | F01D 17/04 |
| 9,777,576 B2 * | 10/2017 | Maguire | ............ | F01D 5/06 |
| 10,190,440 B2 * | 1/2019 | Argote | ............ | F01D 21/04 |
| 10,221,730 B2 * | 3/2019 | Adams | ............ | F01D 15/10 |
| 10,228,304 B2 * | 3/2019 | Heyerman | ............ | G01M 13/028 |
| 10,228,305 B2 * | 3/2019 | Shenouda | ............ | F01D 21/045 |
| 2008/0112794 A1 * | 5/2008 | Lee | ............ | F01D 5/189 |
| | | | | 415/115 |
| 2008/0178603 A1 * | 7/2008 | Mons | ............ | F01D 21/003 |
| | | | | 60/779 |
| 2009/0016886 A1 * | 1/2009 | Pichel | ............ | F01D 5/025 |
| | | | | 416/198 A |
| 2009/0047124 A1 * | 2/2009 | Glahn | ............ | F01D 11/025 |
| | | | | 415/174.5 |
| 2009/0129916 A1 * | 5/2009 | Young | ............ | F01D 11/001 |
| | | | | 415/115 |
| 2010/0172761 A1 * | 7/2010 | Le Goff | ............ | B23K 15/0053 |
| | | | | 416/198 A |
| 2011/0239661 A1 * | 10/2011 | Belmonte | ............ | F01D 5/06 |
| | | | | 60/796 |
| 2012/0060507 A1 * | 3/2012 | King | ............ | F01D 5/081 |
| | | | | 60/782 |
| 2013/0340521 A1 * | 12/2013 | Clark | ............ | F01D 5/027 |
| | | | | 73/462 |
| 2014/0150401 A1 | 6/2014 | Venter | | |
| 2014/0169953 A1 * | 6/2014 | Maguire | ............ | F01D 5/06 |
| | | | | 415/173.1 |
| 2015/0046126 A1 * | 2/2015 | Kepler | ............ | F01D 5/06 |
| | | | | 702/189 |
| 2015/0343573 A1 | 12/2015 | Albert et al. | | |
| 2016/0090918 A1 * | 3/2016 | Certain | ............ | F01D 21/003 |
| | | | | 415/1 |
| 2016/0177770 A1 * | 6/2016 | Adams | ............ | F01D 15/10 |
| | | | | 290/46 |
| 2016/0363001 A1 * | 12/2016 | Argote | ............ | F01D 21/04 |
| 2017/0306772 A1 * | 10/2017 | Fulayter | ............ | F01D 5/34 |
| 2018/0274365 A1 * | 9/2018 | Stuart | ............ | F01D 9/041 |
| 2019/0211683 A1 * | 7/2019 | Bintz | ............ | F01D 5/06 |

OTHER PUBLICATIONS

Oct. 27, 2017 Search Report issued in European Patent Application No. 17 17 5682.

* cited by examiner

TURBINE ARRANGEMENT

The present disclosure concerns a turbine arrangement, particularly a turbine arrangement in a gas turbine engine.

According to a first aspect of the present invention there is provided a turbine arrangement for a gas turbine engine comprising:
- a turbine shaft;
- an axial array of turbine rotors, having a first axial end defined by a first of the turbine rotors and having a second axial end;
- a drive arm coupled between the turbine shaft and the first axial end; and
- a measurement system arranged to measure a parameter of the turbine arrangement, the measurement system positioned at the second axial end.

Advantageously the measurement system is sensitive to changes caused by a failure anywhere in the turbine arrangement. Advantageously there are no turbine rotors between the first axial end and the drive arm coupling.

Each turbine rotor may be mounted to a disc, the drive arm coupled to the disc of the first of the turbine rotors. Advantageously the drive arm may be coupled at a position which is radially close to the rotational axis of the engine compared to later turbine rotors.

The array may comprise at least two turbine rotors. Alternatively the array may comprise at least three turbine rotors. The array may comprise multiple turbine rotors.

The turbine arrangement may further comprise an interstage spacer between each adjacent pair of turbine rotors. Each spacer may be arranged to transmit drive through the turbine arrangement.

The measurement system may comprise a speed measurement system. The measurement system may comprise a phonic wheel and a magnetic inductance speed sensor. Advantageously rotational speed is strongly correlated to failures of the turbine arrangement.

Alternatively the measurement system may comprise an axial translation measurement system. The measurement system may comprise a translation sensor. The translation sensor may be a position sensor; a mechanical contact sensor; or a non-contact sensor. Advantageously failures causing loss of axial location of the turbine arrangement can be detected using such a measurement system.

Alternatively the measurement system may comprise a shaft twist measurement system. The measurement system may comprise an angular position sensor. It may comprise a further angular position sensor positioned nearer to the first axial end of the turbine arrangement or in a fan or compressor, and processing to compare the measurements from the two sensors. The measurement system may comprise one or more timing sensor located on stationary engine structure and timing features located on the turbine arrangement. The shaft twist may be determined by comparison of the period of the timing measurements from the different timing features.

The present invention also provides a gas turbine engine comprising the turbine arrangement as described.

The gas turbine engine may comprise a controller configured to compare the measured parameter to a comparison parameter. The controller may be further configured to implement mitigation action if the measured parameter exceeds the comparison parameter. The controller may be configured to implement mitigation action if the measured parameter exceeds the comparison parameter by a predetermined margin. The mitigation action may be any one or more of: reduce fuel flow to the engine; shut-off fuel flow to the engine; shut down the engine; reduce rotation speed of the turbine shaft. Advantageously serious consequences of a failure in the turbine arrangement may be mitigated or reduced.

The comparison parameter may be a comparison speed. The comparison speed may be an expected speed determined from a model or from empirical data corresponding to normal operation of the engine. Alternatively the comparison speed may be a threshold speed. The threshold speed may be an absolute value. Advantageously the processing power required is minimised. Alternatively the threshold speed may be dependent on engine thrust demand. Advantageously the threshold speed is therefore adaptable to changes in the engine performance over time.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
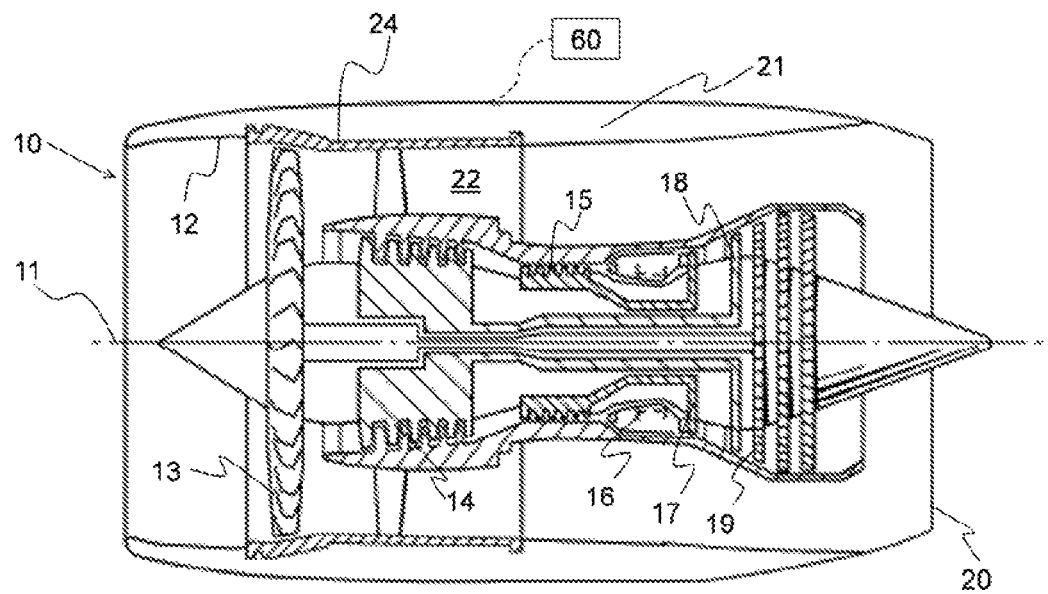
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
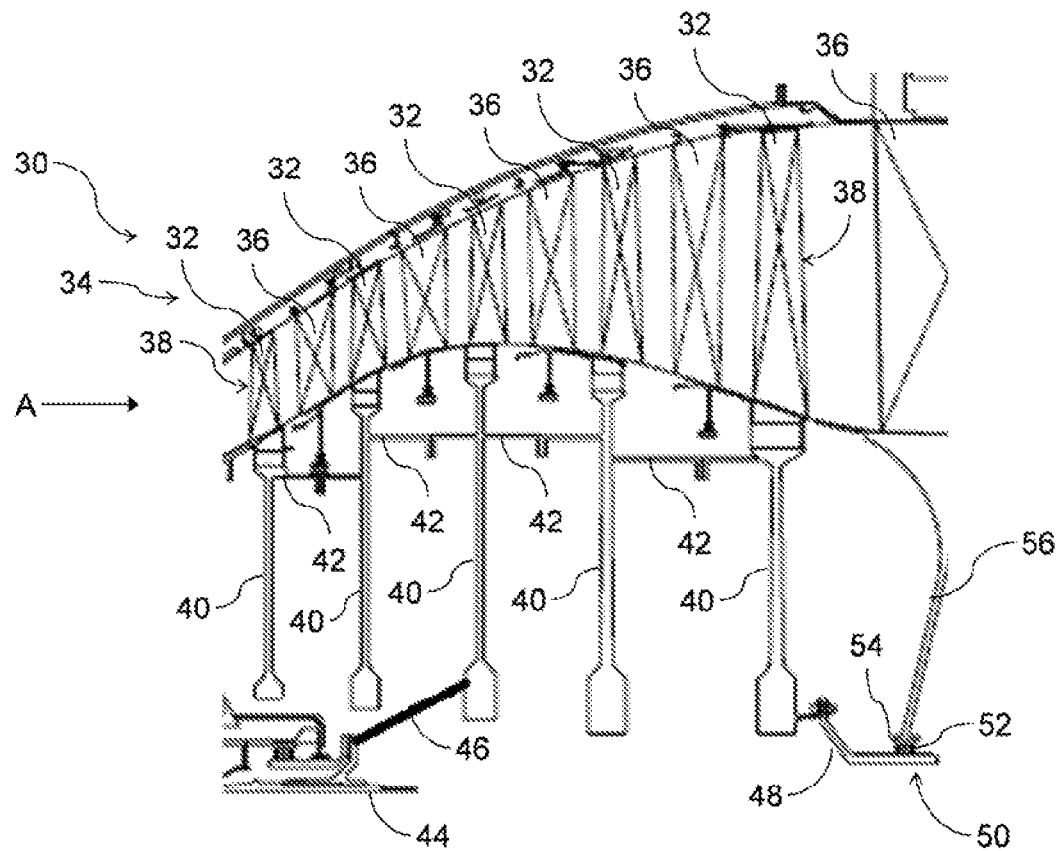
FIG. 2 is a sectional side view of a known turbine arrangement.

A known turbine arrangement 30 is shown in FIG. 2. The turbine arrangement 30 may be a low pressure turbine 19. The turbine arrangement 30 comprises a plurality of turbine rotors 32, five as illustrated, which are configured as an axial array 34. The turbine rotors 32 each comprise an annular array of rotor blades 38 which act to slow and expand the working gas flow therethrough, shown by arrow A. Each turbine rotor 32 is mounted to a disc 40 which extends radially inwardly towards the rotational axis 11 of the gas turbine engine 10. The discs 40 do not interact with the working gas. The turbine rotors 32 rotate about the engine rotational axis 11. The turbine rotor blades 38 are interspersed by stators 36, annular arrays of static aerofoils, which slow and redirect the air expelled by each turbine rotor 32 in the conventional manner.

Between each axially adjacent pair of turbine rotors 32 is an interstage spacer 42. The spacer 42 acts to maintain the axial spacing between the adjacent pair of turbine rotors 32. It also acts to couple together the stages of the turbine arrangement 30 so that the turbine rotors 32 rotate in synchronicity. The spacers 42 also transmit drive through the turbine stage.

A turbine shaft 44 rotates about the rotational axis 11 of the engine 10. It comprises one of the interconnecting shafts coupling the turbine to a compressor or fan. The turbine rotors 32 are coupled to the turbine shaft 44 through a drive arm 46 which extends between the turbine shaft 44 and an intermediate one of the discs 40. As illustrated the drive arm 46 is coupled to the third, middle, disc 40. The drive generated by the flow of hot gases through the turbine stages causes the turbine rotors 32 to rotate. The drive is transmitted via the drive arm 46 to the turbine shaft 44 which is coupled to one of the compressors 14, 15 or the fan 13.

The turbine arrangement 30 has a first axial end, which may be defined by the first of the turbine rotors 32 to receive the working gas, and a second axial end, which may be defined by the rotor 32 in the turbine arrangement 30 that receives the working gas flow last. Rotating structure 48 is coupled to or integral with the disc 40 of the last of the turbine rotors 32 at the second axial end. The rotating structure 48 includes a portion which extends axially to present a surface which is coaxial with the rotational axis 11. A speed measuring system 50 is provided at the second axial end of the array 34 of turbine rotors 32. Thus the speed measuring system 50 is provided in the vicinity of the last disc 40 in the arrangement 30.

The speed measuring system 50 may take any suitable form. For example, a phonic wheel 52 (sometimes called an exciter wheel) may be mounted to or integral with the axially extending portion of the rotating structure 48. A phonic wheel 52 comprises an annular array of radially extending teeth which rotates with the rotating structure 48 and therefore at the same rotational speed as the turbine arrangement 30. A speed sensor 54, for example a magnetic inductance speed sensor, is mounted in close proximity to the phonic wheel 52. The teeth of the phonic wheel 52 passing such a speed sensor 54 induce a regularly changing magnetic field. The frequency of the oscillation of the magnetic field corresponds to the rotational speed. The rotational speed is measured repeatedly at regular intervals, for example many times per second.

The speed sensor 54 may be mounted to or integral with static structure 56 of the engine 10. The speed sensor 54 may be positioned at any circumferential position at which mounting is convenient. There may be more than one speed sensor 54, circumferentially spaced, to provide redundancy and/or averaging of the measured turbine rotational speed.

Although the turbine arrangement 30 shown in FIG. 2 is effective for measuring rotational speed during normal running of the engine 10 there are failure conditions which cannot be detected. In particular, if part of the turbine arrangement 30 fails between the first axial end of the array 34 of turbine rotors 32 and the rotor 32 to which the drive arm 46 is connected. The change of speed of the released turbine rotors 32 will not be measured by the speed measuring system 50 although the slowing of the remains of the turbine arrangement 50 will be measured by the speed measuring system 50. Nonetheless, such a failure is potentially hazardous as the turbine rotors 32 are accelerated by the flow of hot working gas and are no longer attached to the load, the compressors 14, 15 or fan 13. Thus the disconnected turbine rotors 32 may accelerate until the turbine discs 50 burst and debris is emitted.

Figure 3:
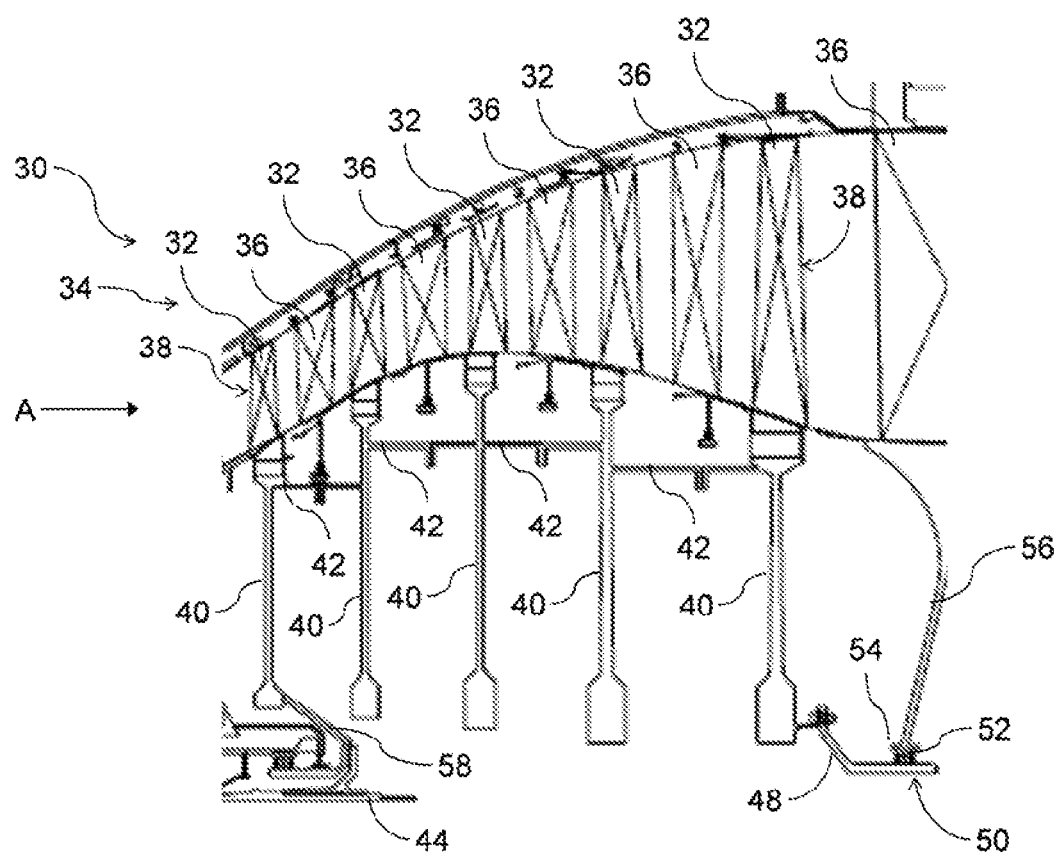
FIG. 3 is a sectional side view of a turbine arrangement.

The present invention modifies the turbine arrangement 30 shown in FIG. 2 to overcome this problem. The turbine arrangement 30 according to the present disclosure is shown in FIG. 3, common features using common reference numerals. The drive arm 46 which connected the turbine shaft 44 to the disc 40 of an intermediate turbine rotor 32 is omitted. Instead, drive arm 58 is provided which connects between the turbine shaft 44 and the first of the turbine rotors 32 at the first end of the axial array 34.

Advantageously there are thus no turbine rotors 32 axially forward of the drive arm 58 connection. This means that any failures anywhere in the turbine arrangement 30 will affect the rotational speed measured by the speed measurement system 50. Consequently the rotational speed measurement can be used as an indication of turbine failure, before the acceleration becomes uncontrollable and debris is released. Mitigation actions can then be implemented. Such mitigation actions could include reducing or shutting off fuel flow to the engine 10 which consequently slows the turbine rotors 32, to a safe speed or even to a halt if the fuel flow is shut off. Alternative mitigation actions may include shutting down the engine 10 by different means; or applying a brake to the turbine rotors 32 and/or the turbine shaft 44 to retard or stop their rotation. One or more of the turbine rotors 32 in the axial array 34 may be deliberately destroyed in a controlled manner to prevent uncontrolled debris release. For example, blade clashing or slicing may be instigated to dice the rotor blades 38 into sufficiently small pieces that they do not have enough momentum to escape the turbine housing.

It is well known in the art that it is important to quickly mitigate turbine failures to prevent or minimise debris escape. Advantageously the turbine arrangement 30 disclosed enables rapid detection of turbine acceleration via the speed measurement system 50 which is sensitive to any changes in the turbine arrangement 30. The detected speed, and thus the derived acceleration, of the turbine can be compared to the expected speed, and thus acceleration, given current engine conditions. Therefore, the speed measurement system 50 will not cause mitigation actions to occur during normal acceleration transients. Alternatively the detected speed, and thus the derived acceleration, of the turbine can be compared to a threshold speed, and thus acceleration. The threshold speed and/or acceleration may be an absolute value or may be related to the underlying turbine speed or another engine parameter, for example the engine thrust demand. This means that the threshold value is higher when the engine 10 is running more quickly in response to a demand for higher thrust and, conversely, is lower when the engine 10 runs more slowly to meet a lower thrust demand.

The gas turbine engine 10 may include a controller 60, FIG. 1. The controller 60 may be an engine electronic controller, functionally linked thereto or may be a dedicated controller for turbine overspeed control. The controller 60 may be configured to receive the rotational speed measurements from the speed measurement system 50 and to process them. For example temporally spaced measurements may be used to derive the acceleration of the turbine arrangement 30; or multiple measurements may be used to derive an average rotational speed measurement or to identify and discard anomalous measurements.

The controller 60 is also configured to compare the measured speed to a comparison speed. The comparison speed may be an expected speed calculated on the basis of current engine running conditions; a previously measured speed; an empirically derived speed; or a model derived speed. Alternatively the comparison speed may be a threshold speed. The threshold speed may be an absolute value or may be dependent on operating conditions, indicated by thrust demand or a previous speed measurement.

The controller 60 is configured to implement mitigation action if the measured speed exceeds the comparison speed. There may be an error margin associated with the comparison speed so that the measured speed has to exceed the comparison speed by a predefined margin before the mitigation action is triggered. Alternatively the controller 60 can be configured so that two, three or more consecutive measured speeds must exceed the comparison speed before mitigation action is triggered. Either of these modifications reduces the possibility of false triggering of mitigation action. Advantageously the gas turbine engine 10 is therefore only shut down when there is certainty that there is a turbine failure to mitigate but the reaction time is not significantly compromised so that the mitigation actions remain effective.

The turbine arrangement 30 may be any multi-stage turbine arrangement. It may be a low pressure turbine 19 of a gas turbine engine 10. Alternatively it may be an intermediate pressure turbine 18 or high pressure turbine 17 of a gas turbine engine 10. Such a gas turbine engine 10 may be used to power an aircraft, a marine vessel or a power plant.

Although a speed measurement system 50 has been described, alternative measurement systems 50 may be substituted with equal felicity. For example the measurement system 50 may be configured to measure axial translation of the rear of the turbine arrangement 30. The rear of the turbine arrangement 30 shifts rearwards in response to a break because it is no longer axially located. Such a measurement system 50 may include an absolute or relative position sensor; a mechanical contact sensor which is triggered by part of the turbine arrangement 30 moving into contact with the sensor; or a non-contact sensor such as a laser beam which is broken by the rearward movement of the turbine arrangement 30 into the line of the beam. The measurement system 50 may alternatively be configured to measure shaft twist which increases if the turbine and load (compressor or fan) rotate at different speeds. Such a shaft twist measurement system 50 may also include a measurement sensor at the first axial end of the turbine arrangement 30 or of the shaft 44.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A turbine arrangement for a gas turbine engine comprising:
   a turbine shaft;
   an axial array of turbine rotors, the axial array having first and second axial ends defined by first and second turbine rotors respectively of the axial array of turbine rotors, each of the first and second turbine rotors in the axial array of turbine rotors being adjacent to at least one other turbine rotor to form one or more pairs of adjacent turbine rotors, wherein the one or more pairs of adjacent turbine rotors is between the first and second turbine rotors, and any given pair of the adjacent turbine rotors are coupled together to transmit drive therebetween;
   a drive arm directly coupled to the turbine shaft and the axial array of turbine rotors at the first turbine rotor only; and
   a measurement system arranged to measure a parameter indicative of rotational speed of the second axial end of the axial array of turbine rotors.

2. The turbine arrangement as claimed in claim 1, wherein each turbine rotor of the axial array of turbine rotors is mounted to a respective disc, and the drive arm is coupled to the disc to which the first turbine rotor is mounted.

3. The turbine arrangement as claimed in claim 1, wherein the axial array of turbine rotors comprises at least two turbine rotors.

4. The turbine arrangement as claimed in claim 1, wherein the axial array of turbine rotors comprises at least three turbine rotors.

5. The turbine arrangement as claimed in claim 1, further comprising a respective interstage spacer between each adjacent pair of turbine rotors, each spacer arranged to transmit drive.

6. The turbine arrangement as claimed in claim 1, wherein the measurement system comprises a phonic wheel and a magnetic inductance speed sensor.

7. The turbine arrangement as claimed in claim 1, wherein there exists no turbine rotors of the axial array that are axially forward of a connection provided by the drive arm.

8. A gas turbine engine comprising the turbine arrangement as claimed in claim 1.

9. The gas turbine engine as claimed in claim 8, further comprising a controller configured to compare the measured parameter to a comparison parameter and to implement mitigation action if the measured parameter exceeds the comparison parameter.

10. The gas turbine engine as claimed in claim 9, wherein the mitigation action consists of any one or a combination of: reduce fuel flow to the engine; shut-off fuel flow to the engine; shut down the engine; reduce the rotational speed of the turbine shaft.

11. The gas turbine engine as claimed in claim 9, wherein the comparison parameter is a comparison speed.

12. The gas turbine engine as claimed in claim 11, wherein the comparison speed is an expected speed determined from a model or empirical data corresponding to normal operation of the engine.

13. The gas turbine engine as claimed in claim 11, wherein the comparison speed is a threshold speed, which is an absolute value or is dependent on engine thrust demand.

* * * * *